(12) United States Patent
Leblang et al.

(10) Patent No.: US 8,631,012 B2
(45) Date of Patent: Jan. 14, 2014

(54) METHOD AND SYSTEM FOR IDENTIFYING AND DISPLAYING IMAGES IN RESPONSE TO SEARCH QUERIES

(75) Inventors: Jonathan A Leblang, Menlo Park, CA (US); Hilliard B Siegel, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 1319 days.

(21) Appl. No.: 11/540,115

(22) Filed: Sep. 29, 2006

(65) Prior Publication Data

US 2008/0082497 A1  Apr. 3, 2008

(51) Int. Cl.
G06F 17/30 (2006.01)

(52) U.S. Cl.
USPC .......................................................... 707/741

(58) Field of Classification Search
None
See application file for complete search history.

(56) References Cited

U.S. PATENT DOCUMENTS

| | | | |
|---|---|---|---|
| 5,390,259 A * | 2/1995 | Withgott et al. ............... | 382/173 |
| 5,579,471 A * | 11/1996 | Barber et al. .................. | 715/700 |
| 5,680,479 A * | 10/1997 | Wang et al. .................... | 382/176 |
| 5,960,448 A | 9/1999 | Reichek | |
| 5,963,966 A * | 10/1999 | Mitchell et al. ............... | 715/236 |
| 5,970,483 A | 10/1999 | Evans | |
| 5,987,448 A | 11/1999 | Evans et al. | |
| 6,002,798 A * | 12/1999 | Palmer et al. .................. | 382/176 |
| 6,192,165 B1 * | 2/2001 | Irons .............................. | 382/306 |
| 6,226,631 B1 | 5/2001 | Evans | |
| 6,363,179 B1 | 3/2002 | Evans et al. | |
| 6,453,079 B1 | 9/2002 | McInerny | |
| 6,532,461 B2 | 3/2003 | Evans | |
| 6,859,799 B1 | 2/2005 | Yuen | |
| 6,904,560 B1 * | 6/2005 | Panda ............................ | 715/202 |
| 7,028,253 B1 * | 4/2006 | Lieberman et al. ........... | 715/232 |
| 7,457,467 B2 * | 11/2008 | Dance et al. ................... | 382/224 |
| 7,542,969 B1 * | 6/2009 | Rappaport et al. ..................... | 1/1 |
| 8,162,125 B1 * | 4/2012 | Csulits et al. ................. | 194/206 |
| 2004/0015775 A1 * | 1/2004 | Simske et al. ................ | 715/500 |
| 2004/0225686 A1 | 11/2004 | Li | |
| 2006/0095830 A1 * | 5/2006 | Krishna et al. ................ | 715/500 |
| 2006/0136491 A1 * | 6/2006 | Berkner et al. ........... | 707/103 R |
| 2007/0097420 A1 * | 5/2007 | Shah et al. .................... | 358/1.15 |
| 2007/0214114 A1 * | 9/2007 | Liu et al. ............................ | 707/3 |
| 2007/0250532 A1 * | 10/2007 | Beato et al. ............... | 707/103 R |

FOREIGN PATENT DOCUMENTS

EP  1267280 A2  12/2002
WO  2005031526 A2  4/2005

* cited by examiner

*Primary Examiner* — Ajay Bhatia
*Assistant Examiner* — Grace Park
(74) *Attorney, Agent, or Firm* — Novak Druce Connolly Bove + Quigg LLP

(57) ABSTRACT

A method and system are disclosed that associate search keywords with relevant images from within sources, such as books, magazines, journals, etc., thereby making the images available for search using the associated keyword. Such associations enable a search engine to identify, in response to a search query, a relevant image within the source that would have not been provided otherwise. For example, an image of the Titanic that appears in a historical or cultural book may be associated with the search keyword "ship." Accordingly, if a user submits the search query "ship and Infamous Ocean Voyages" (i.e., the keyword "ship" and the title of a book), an image of the Titanic from the book entitled "Infamous Ocean Voyages" may be returned among the search results.

54 Claims, 6 Drawing Sheets

METHOD AND SYSTEM FOR IDENTIFYING AND DISPLAYING IMAGES IN RESPONSE TO SEARCH QUERIES

FIELD OF THE INVENTION

The present invention is directed to systems and methods that identify and display images from within sources, e.g., books, magazines, etc., in response to search queries.

BACKGROUND

The information age has produced an explosion of content for people to read. Searchable content is often electronically stored in information databases which may be accessed locally or which may be accessed remotely via a private network, such as an intranetwork, or a public network, such as the Internet. Various search engines are available for searching such content in response to a query from a user. The search results returned by the search engine often include text, images, links to other Web pages or Web sites, etc. Images may include graphics, such as charts, drawings, diagrams, pictures, photos, etc. Accordingly, images often have richer information content than written text, and thus, are more efficient vehicles for conveying information than plain text. For example, to describe the information contained in a single picture or drawing, many pages of text may have to be written. Moreover, people may be quicker to spot desired information in an image or group of images than in several pages of text. One reason for the quick visual recognition of desired information is that the human visual cortex processes visual information in parallel, whereas reading is inherently a sequential process. Hence, visual information often provides higher efficiency over written text.

Given the above, providing images in response to search queries, in addition to or in lieu of text, often enhances the user experience, and improves efficiency and effectiveness of the search. Images that may be displayed in response to search queries may be found on Web pages made available via the Internet. Another repository for images is private image archives. Such images are often stored in individual image files that are indexed and maintained in an information database and/or Web server. Less utilized in response to search queries are images from within sources such as books, magazines, newspapers, newsletters, manuals, guides, references, articles, reports, documents, etc. Currently, no methods or systems are available which provide images from within such sources in response to a search query. For example, a web search for a keyword "ship" may return information about ship manufacturers, ship building, cruise ships, etc., but the search results, most probably, will not include an image of a ship from within a book, such as a book on the Titanic or other historical or technical books related to ships, unless such an image is saved in an indexed information database as an individual image file. Accordingly, images from within sources such as books constitute a rich source of untapped information for search engines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with embodiments of the invention, a system is provided for associating keywords with images found on the pages of a source, such as a book, magazine, journal, etc. The system may include a first data store that stores text and related text metadata that are obtained from the source pages, e.g., using optical character recognition. The system may also include a second data store that stores images and related image metadata that are also obtained from the source pages. In other embodiments, the first and second data stores may be combined.

The system may also include a relevance engine that generates a relevance index based at least in part on the information stored in the respective data stores. The relevance index records an association between a keyword from the text of the source and an image of the source. The relevance engine may generate the relevance index using relevance techniques based on a physical arrangement of the source pages, typography of the text in the source pages, semantic analysis of the source pages, statistical analysis of the source pages, navigational analysis of the source pages, manual assessment of the source pages, etc., and/or any combination of the above. The association may be used to access the image associated with the keyword in response to a search query including the keyword.

A methods and computer-readable medium having instructions encoded thereon for associating keywords with images from within a source that are generally consistent with the system described above are also disclosed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A method and system are described that identify and display images from within sources in response to search queries. More specifically, a method and system are disclosed that associate search keywords with relevant images from within sources, thereby making the images available for search using the associated keyword. Such associations enable a search engine to identify, in response to a search query, a relevant image within the source that would have not been provided otherwise. For example, an image of the Titanic that appears in a historical or cultural book may be associated with the search keyword "ship." Accordingly, if a user submits the search query "ship and Infamous Ocean Voyages" (i.e., the keyword "ship" and the title of a book), an image of the Titanic from the book entitled "Infamous Ocean Voyages" may be returned among the search results.

Figure 1:
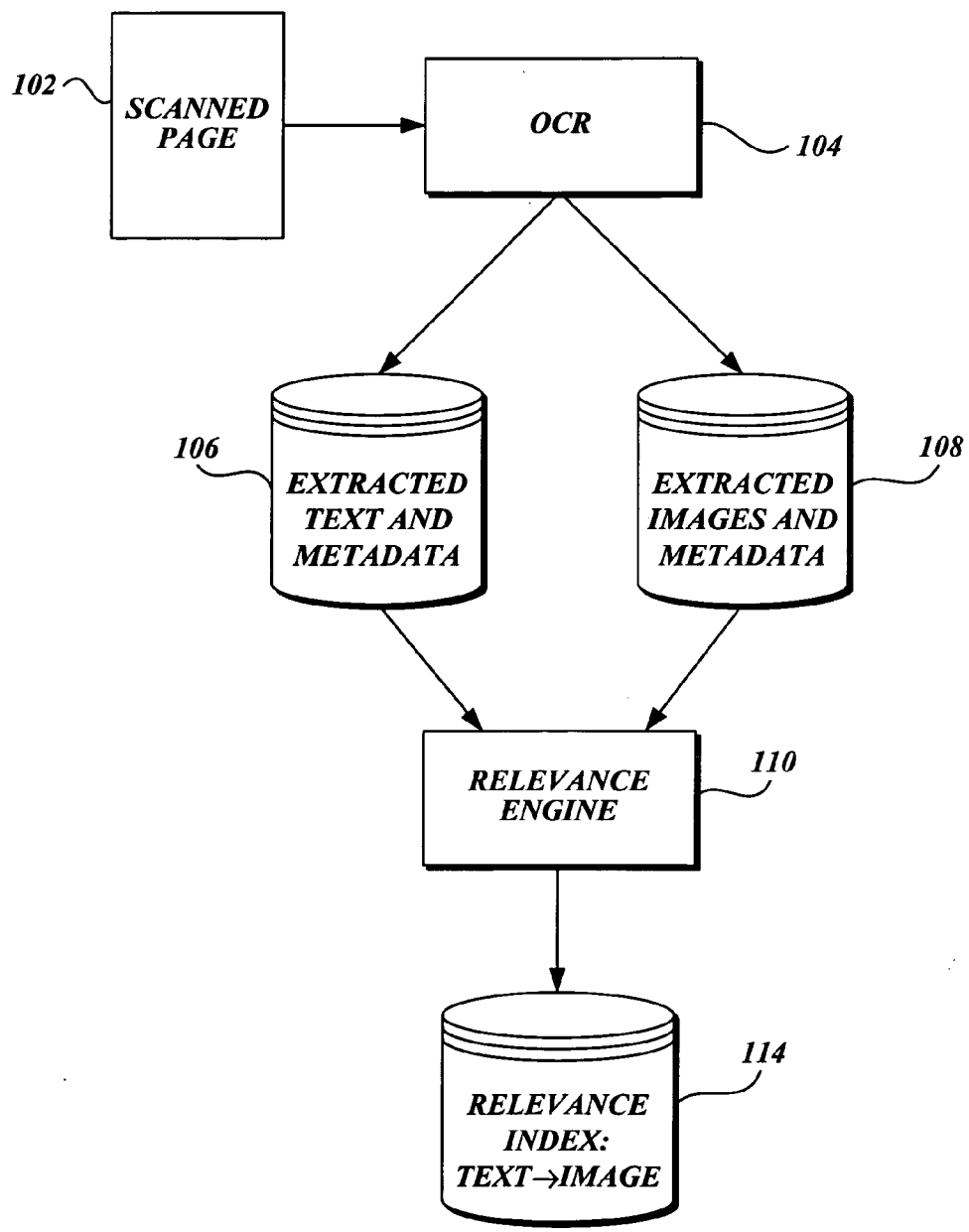
FIG. 1 is a block diagram depicting a sample embodiment of a system formed in accordance with the present invention for creating a relevance index for images found within sources.

In accordance with one embodiment, to make images from within a source available for search, a relevance index is created to associate search keywords with the images. FIG. 1 is a block diagram showing an embodiment of a system for creating such an index. More specifically, digitized data from a scanned page 102 of a source is input to an optical character recognition (OCR) module 104. The scanned page 102 includes, but is not limited to, scanned data from a physical page, a section of the source, or any portion of the source. For example, a portion of the source may comprise data from part of a physical page of a book or include data from more than one physical page of the book. In one embodiment, the scanned page 102 may include data from predefined divisions of the source, such as sections or subsections of a book. In another embodiment, the scanned page 102 may include data from an article in a magazine. Those skilled in the art will appreciate that many other divisions of the source may be defined to constitute a scanned page 102. The OCR module 104 extracts, inter alia, text (e.g., ASCII characters), non-text data (e.g., images), and associated metadata describing the text and/or non-text data in the scanned page. The metadata may include, but is not limited to, position of features such as text and non-text (e.g., images) data, distance information (for example, a distance between text and an image), font size, font style, caption information, color information, etc. The metadata may also include navigational information about the source, such as table of contents, list of illustrations, indices, etc. The metadata may additionally include cataloging information about the source, such as ISBN number, publishing information, etc. Cataloging information may be obtained from within the source or from external data sources, such as library or archival databases. Accordingly, metadata may be generated by the OCR module 104 and/or be obtained separately from external data sources. In the illustrated embodiment, a data store 106, such as a relational database or a file, may be used to store the extracted text and associated metadata, including position metadata. Another data store 108 may be used to store the extracted images and associated metadata. In another embodiment, a single data store may be used to store the extracted text, images, and metadata, wherein data items are marked to distinguish one type of metadata from another.

As further depicted in FIG. 1, a relevance engine 110 may be used to analyze the text, images, and metadata stored in the data stores 106 and 108 to determine whether a given term in the text has any relevance to an image found in the source. The relevance engine 110 may use a variety of techniques to make this determination. For example, different relevance techniques may be used for different types of sources. In one embodiment, the relevance engine 110 may be monolithic, encoding the relevance techniques in the design of the relevance engine 110. In another embodiment, the relevance engine 110 may be modular and rule-based. Various relevance techniques implemented by the relevance engine will be described in more detail below.

The determinations made by the relevance engine 110 that associate keywords from the text with relevant images are subsequently recorded in a relevance index stored in a data store 114. In one embodiment, the association between a keyword and a relevant image is implemented and stored in the relevance index as a pointer from the keyword to the relevant image in the data store 108. The pointer may then be used to access the relevant image in the data store 108 containing the image extracted from scanned source pages. Accordingly, if a search query includes a keyword found in the relevance index data store 114, the image identified by the corresponding pointer may be returned from the data store 108 in response to the query, e.g., among the other more typical search results.

As discussed with respect to FIG. 1, the relevance index 114 is typically pre-compiled (and periodically updated) by systematically scanning pages of sources and storing the results. The relevance index 114 is created by the relevance engine 110 using a variety of relevance techniques. Relevance techniques may be based on, e.g., physical layout or arrangement of text and images, typography, semantic analysis of terms, statistical analysis, navigational assessment, manual assessment, and/or a combination of some or all of the foregoing. Relevance techniques based on a physical layout or arrangement may include techniques that analyze the physical relationships between text and images in a source page. For example, the physical distance between an image and a term in the text may be used to determine if the term is relevant to the image. Accordingly, such physical relationships may be used to evaluate the relevance of such terms and images to each other.

Typography techniques for assessing relevance of terms to images may also be employed. Typography is the style and arrangement of text and generally refers to what text looks like. For example, terms appearing in italics are often used to refer to an image. As described in more detail below, differences in font may also be used to assess the relevance of a term to various images in the document.

Relevance techniques may also include semantic analysis of terms from the source page. Semantic analysis techniques use the conventional or generally accepted meanings of a term to determine if the term is relevant to an image. For example, the term "Figure" generally refers to an image. As another example, terms appearing within parentheses, e.g., "(see page 2 for a photo of the Titanic)," often refer to an image. Accordingly, the appearance of parentheses may be used to identify terms may be used to identify terms relevant to an image within the source.

Relevance techniques may also include statistical analysis of terms and images in a source. One statistical technique includes analysis of a ratio of number of terms to a number of images in a source, which ratio may indicate whether terms appearing on a page are more likely to be relevant to a nearby image. For example, children's books generally have a lower ratio of terms to images. Therefore, terms therein describe some aspect or feature in an image and can be used as keywords for the image(s) found on the same page.

Relevance techniques may also include manual assessment of relevance between terms and images. These techniques generally involve a human operator visually examining an image from a source and associating various terms from the source to an image. For example, a human operator may associate the term "iceberg" with the image of a lifeboat in a source related to ocean voyages. In one embodiment, such manual assessment is conducted after other automated relevance techniques are employed in order to confirm the result obtained from the automated techniques.

Those skilled in the art will appreciate that other general types of categories of relevance techniques may be used alone or in combination without departing from the spirit of the present disclosure.

Figure 2:
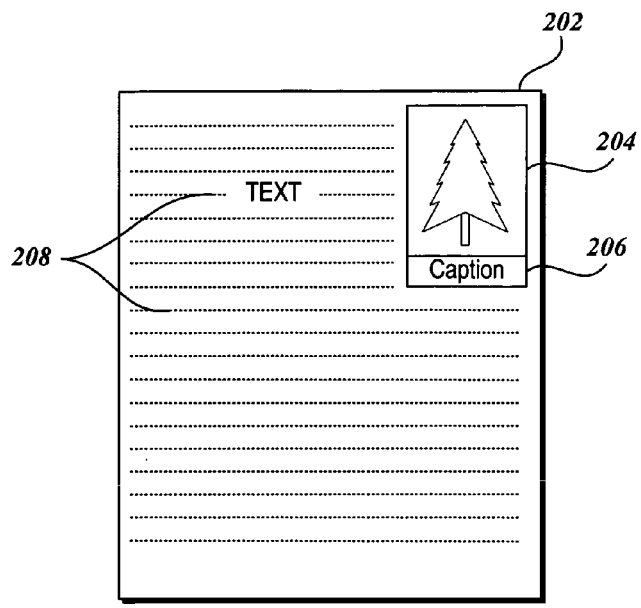
FIG. 2 is a pictorial diagram depicting a sample page from a source including an image that may be indexed in the relevance index in accordance with the present invention.

FIG. 2 is a pictorial diagram depicting a sample page from a source that may be processed by the system shown in FIG. 1. In the sample page 202, text 208 and an image 204 both appear. Accordingly, a physical layout relevance technique for determining keywords associated with an image based on the distance between text and the image may be used for such pages. Such an image distance relevance technique may identify terms, e.g., words, characters, symbols, etc., found within a predetermined physical distance or a predetermined number of terms of an image 204. Such terms are then determined to be keywords related to the image 204. Accordingly, each such keyword is stored in the relevance index 114 along with a pointer to the image in the data store 108.

Yet another physical layout relevance technique for associating a keyword to an image such as image 204 is a caption relevance technique. A caption relevance technique analyzes the metadata for the page to determine if a "glossy" image, such as image 204, is present. If so, the caption relevance technique determines keywords associated with an image based on the caption metadata for the page 202. Accordingly, terms included in a caption are determined to be keywords and are associated with "glossy" image 204. More specifically, each such keyword is stored in the relevance index 114 with a pointer to the relevant image 204 in the data store 108.

Yet another physical layout relevance technique includes a text-in-image relevance technique, which determines keywords based on text appearing within an image itself. Accordingly, terms appearing within the image 404 are determined to be keywords relevant to the image, and are thus stored in the relevance index 114 along with a pointer to the image 204 in the data store 108. In some images text may be shown in various orientations, such as upside down or mirror image. Text with certain orientations may not be recognized by OCR as text, and thus may not be successfully extracted from the image. Accordingly, pattern recognition techniques, such as feature extraction, may be used to identify terms within an image. Such terms would then be associated with the image as keywords by the text-in-image technique.

Figure 3:
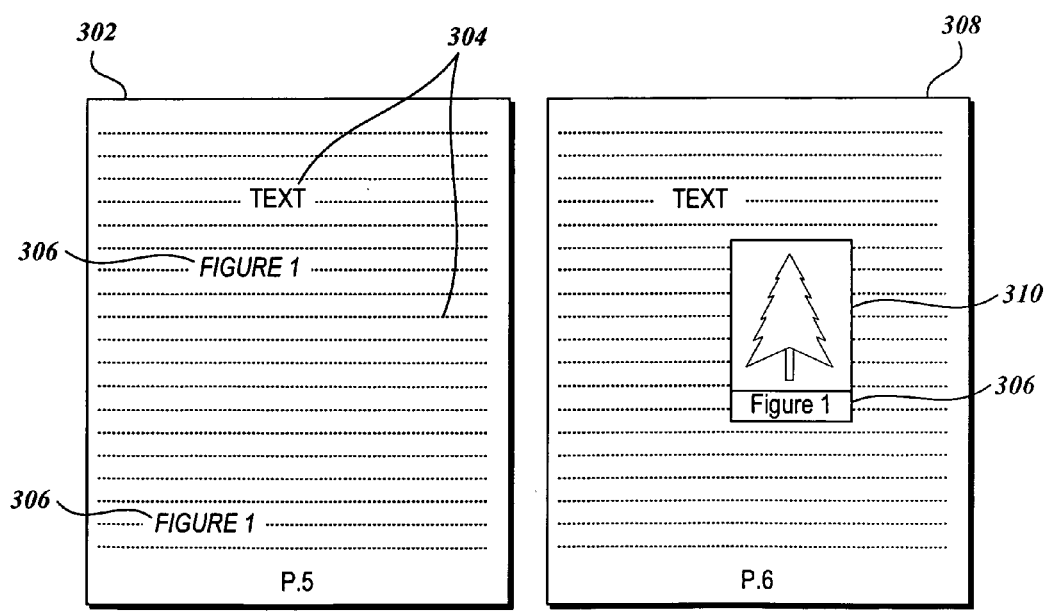
FIG. 3 is pictorial diagram depicting other sample pages from a source including images that may be indexed in the relevance index in accordance with the present invention.

FIG. 3 is a pictorial diagram depicting other sample pages 302 and 308 from a source that may be processed by the system shown in FIG. 1. In this example, text 304 may be included in a page 302, while an image referenced in page 302 by the term "FIG. 1" 306 appears on page 308. In one embodiment, a semantic analysis technique such as an image reference keyword relevance technique may be used to identify terms appearing in text, such as "FIG. 1" as keywords and associate such a keyword with an image in the vicinity of the keyword. For example, if an image is located on the same page as the term "FIG. 1," it is assumed that the image is that referenced by "FIG. 1." Accordingly, the term "FIG. 1" is determined to be an image reference keyword and is stored in the relevance index 114 along with a pointer to the relevant page in the data store 310. If an image is not on the same page (as is the case in the embodiment illustrated in FIG. 3), the technique shall look for an image within ±1 page of the term "FIG. 1." Accordingly, in the embodiment of FIG. 5, the image 310 on the next page 308 would be identified as the image relevant to the term "FIG. 1." The keyword "FIG. 1" and a pointer to the image 310 in the data store 108 would then be stored in the relevance index 114. Those skilled in the art will appreciate that, if an image were not found within ±1 of the term "FIG. 1," that this process could be repeated for additional pages and/or until a maximum number of pages is reviewed. Those skilled in the art will also recognize that various other terms and/or their abbreviations may be considered "image reference" keywords, e.g., "Fig.," "Illustration," "Illus," "Table," "Chart," etc.

In another embodiment, text in the vicinity of image reference keywords may also be determined to be related or relevant to the image thus referenced. For example, a vicinity may be defined as a predetermined number of terms. For example, if the term "ship" occurs in the text 304 of page 302 within four terms or less of the image reference keyword "FIG. 1," then the term "ship" is also determined to be a keyword and is stored in the relevance index 114 along with a pointer to image 310. Subsequently, when the word "ship" is used in a search query by a user, the image 310 on page 308 referenced by "FIG. 1" is returned as part of the search results.

In another embodiment, a typography technique such as a font relevance technique may be implemented to determine keywords based on differences in font compared to other text in a source. Differences in the font may include differences in typeface (e.g., Garamond), style (e.g., italics), weight (e.g., bold), and/or size (e.g., 12-point). Such differences may indicate relevance of a term to an image. For example, a term referring to an image in a book may be in italics. Accordingly, a font relevance technique may be used to identify terms in the text of a page appearing in italics (such as "FIG. 1" in page 302 of FIG. 3) as keywords and associate such keywords with an image in the vicinity of the keyword, in a manner similar to that described above in connection with the image reference keyword technique.

In yet another embodiment, a typography relevance technique such as a parentheses relevance technique may be implemented to identify keywords from terms found in parentheses and associate such keywords with an image found in the vicinity of the keyword, since such terms are often found to be relevant to a nearby image. The parentheses relevance technique may be implemented in a manner similar to that described above in connection with the image reference keyword technique.

In yet another embodiment, the relevance technique may include a navigational relevance technique which analyzes navigational metadata associated with the source for terms that may be used as keywords. More specifically the navigational relevance technique may analyze navigational elements identified in the metadata for a source (e.g., list of illustrations, indices, tables of contents, etc.) for keywords. Such keywords may then be associated with the respective image (e.g., the image found at the page number identified in the list, index, etc.). For example, using a list of illustrations, the terms appearing in the list may be associated with the corresponding image as indicated by a page number in the list.

Those skilled in the art will appreciate that the determination that a given term is a keyword relevant to a given image may be made based on a single relevance technique, or a combination of two or more relevance techniques. Furthermore, those skilled in the art will also appreciate that many other relevance techniques may be defined and applied without departing from the spirit and scope of the present disclosure. In yet other embodiments, the type and/or combination of relevance techniques used to identify keywords and associate them with images may be selected by the relevance engine 110 based on the type of source from which pages are being scanned. More specifically, the relevance engine 110 may identify the type of source (e.g., cookbook, technical treatise, etc.) from the source metadata and implement the relevance techniques most useful for such sources. For example, almost all text in a cookbook (e.g., recipes) is closely associated with images of the food made with the recipe. Therefore, the relevance engine 110 may implement an image distance relevance technique and a text-in-image relevance technique in order to determine keyword image associations.

Figure 4:
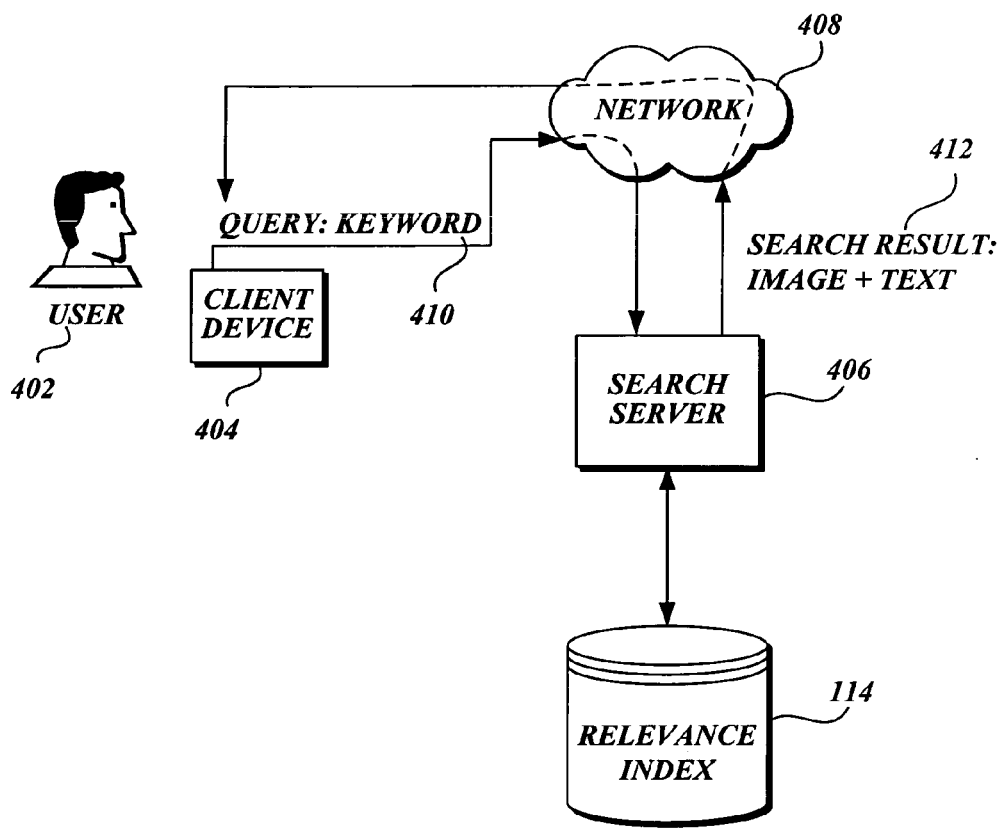
FIG. 4 is a block diagram depicting a sample operating environment in which a search can be conducted using the relevance index shown in FIG. 1.

Once the relevance index 114 has been created, the relevance index 114 may be made available to search engines processing search queries. For example, FIG. 4 is a block diagram depicting a sample operating environment in which a user 402 may submit a search query 410 including a keyword to a search engine implemented by a search server 406 via a search interface implemented on a client computing device 404. Those skilled in the art will recognize that the client device 404 may be any number of computing devices, including, but not limited to, set-top boxes, personal digital assistants, mobile phones, digital media players, e-book readers, Web pads, tablets, laptop computers, desktop computers, etc. The search query 410 is transmitted by the client computing device 404 to a server computing device 406 implementing the search engine application. In one embodiment, the search server 406 may be a dedicated computing device, such as a computer with mass storage facilities. In another embodiment, the search server 406 may be a software application running in the memory of a multi-purpose computing device. The search query 410 submitted by the client computing device 404 is processed by the search server 406 to find and return search results 412. In accordance with one embodiment, the search server 406 uses relevance index 114 to identify images from within sources that are associated with keywords included in the search query 410. The search results 412 are returned to the client computing device 404 and displayed to the user 402 as described below with respect to FIG. 6.

Figure 5:
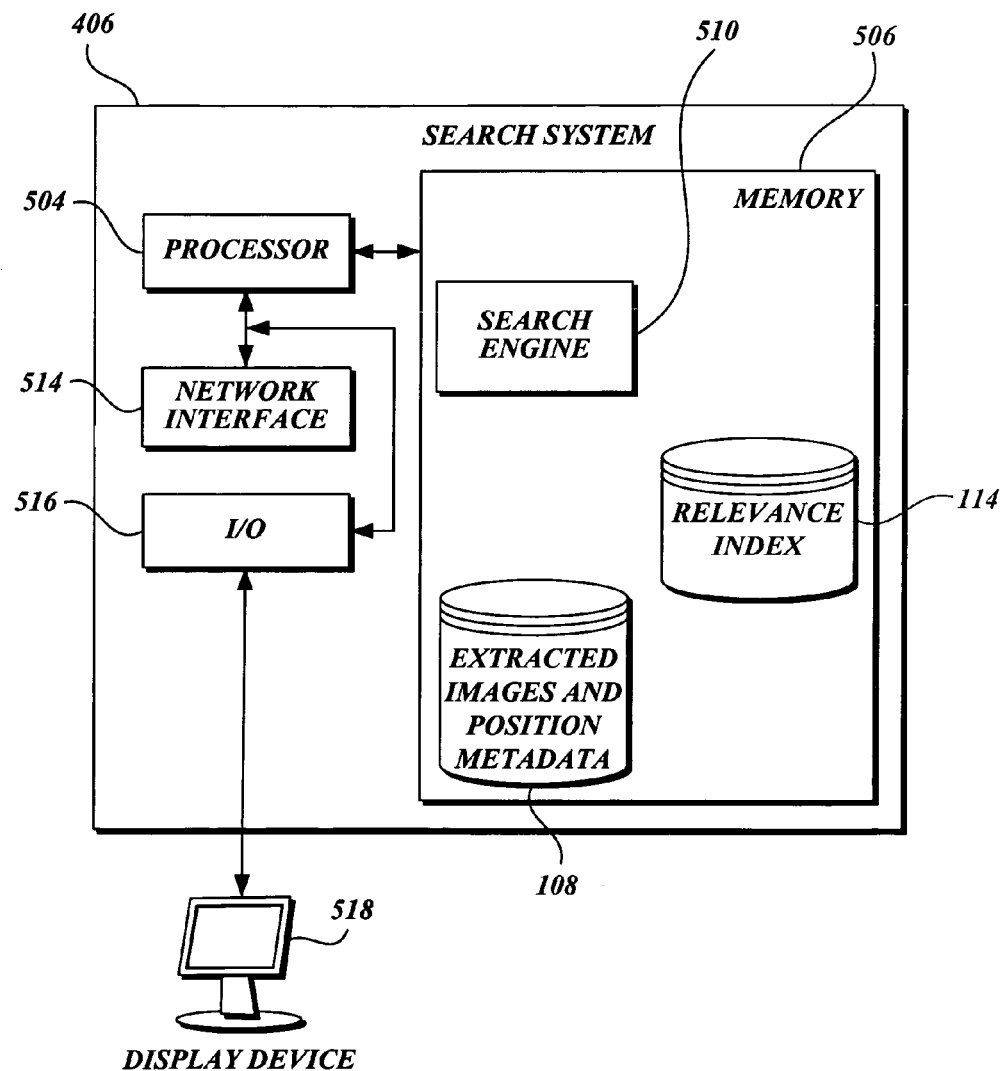
FIG. 5 is a block diagram depicting components of the operating environment shown in FIG. 4 in more detail.

FIG. 5 is a block diagram depicting the components of the search server 406 of the operating environment of FIG. 4 in more detail. In one embodiment, the search server 406 includes a processor 504 for executing software programs in memory 506. In yet another embodiment, the search server 406 may further comprise a search engine application 510, the relevance index 114, and the data store of extracted images and metadata 108. Those skilled in the art will appreciate that a portion or all of the relevance index 114 and/or data store 108 may be located remotely from the search server 406, and hence, accessed via a network interface 514. In addition, the data store 106 of extracted text and position metadata (although not shown) may also be stored locally in memory 506 of the search server 406, or it may be stored and accessed remotely as well. Finally, a display device 518 and I/O (Input/Output) interface 516 may also be provided.

One skilled in the art will appreciate that the data and/or components described above may be stored on a computer-readable medium and loaded into memory 506 of the server 406 (or client device 404) using a drive mechanism associated with the computer-readable medium, such as a floppy, CD-ROM, DVD-ROM drive, or network interface. It will be appreciated that the components could be included on a single device or distributed in any manner. Furthermore, the components shown in FIG. 5 represent an illustrative embodiment. In other embodiments, components can be removed or their functionality can be provided by another component.

In response to a search query 410, the search server 406 may search the data store 108 using the previously compiled relevance index 114 for images related to one or more keywords in the search query 410. More specifically, a search query 410 received by the search server 406 via network 408 is processed by processor 504 running the search engine 510 in conjunction with the relevance index 114. In addition to initiating its typical search, the search engine 510, when executed by the processor 504, determines if any terms in the search query 410 correspond to any keywords stored in the relevance index 114. For each match, the search engine 510 may obtain the pointer corresponding to the keyword from the relevance index 114. The search engine 510 may then retrieve the relevant image identified by the pointer from the data store 108 of extracted images. The search engine may then aggregate the search results and return them to the client computing device 404 via the network 408 using the network interface 514. In one embodiment, the search engine 510 includes a presentation layer for formatting the search results for presentation to the client computing device 404. In other embodiments, the search engine 510, when executed by the processor 504, only processes incoming queries and the presentation layer for formatting search results may be included in another software application running on processor 504 of the search server 406 or running on the client device 404.

Figure 6:
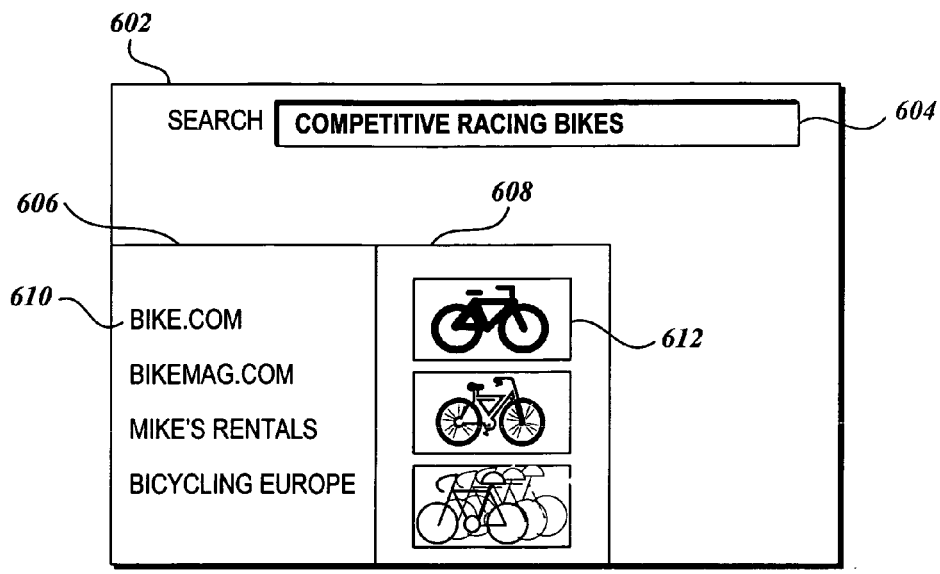
FIG. 6 is a pictorial diagram depicting a sample search result including images obtained from sources as opposed to images stored in an individual file.

The search results 412 returned by the search server 406 usually include a large amount of data including many lines of text, images, and links. To be easily and effectively useable by the user 404, the search results 412 must be formatted and organized in a manner that is easy to find and understand. FIG. 6 is a pictorial diagram depicting a sample search result provided by the system of FIG. 4. In one embodiment, the search results 412 are organized and presented to the user 402 on the client computing device 404 in a search results Web page 602 with multiple columns. The multiple columns may include a text column 606 and an image column 608. The text column 606 may include website links 610, while the image column 608 may include images identified by the relevance index 114 with a reference to the sources from which the images were extracted. Those skilled in the art will appreciate that search results may be organized in many different manners. For example, large amounts of search results data may be presented to the user 404 as multiple numbered pages, which the user 402 may select. In another embodiment, the text data 610 and the image data 612 may be mixed in one list according to degree of relevance. In yet another embodiment, the text data 610 and the image data 612 may be organized based on various contexts selectable by user. For example, the search results may include both historical information and technical information about a search subject matter, such as "ship." The user 402 may select to view the search results 412 in the technical context. In yet another embodiment, the presentation of the search results 412 may be configurable by the user 402. For example, the user 402 may elect to have the image column 608 on the leftmost position in the search results Web page 602 and other columns following the image column 608. The user 402 may select a text data item 610 or an image data item 612 to receive further information on the selected data item.

Figure 7:
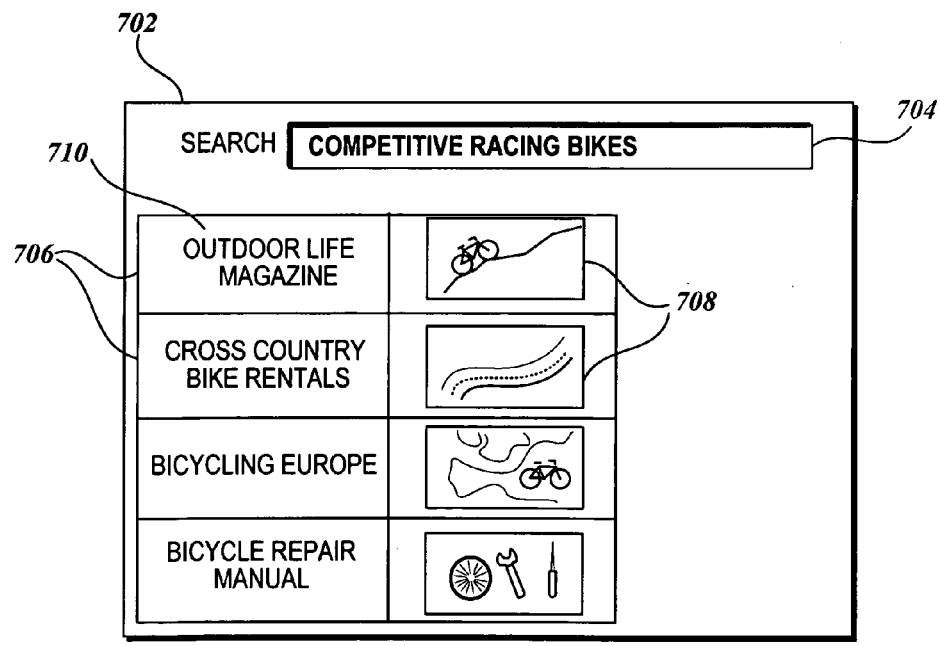
FIG. 7 is a pictorial diagram depicting another sample search result including images obtained from sources as opposed to images stored in individual files.

FIG. 6 depicts a sample search results Web page 602 resulting from a search of, e.g., the World Wide Web. However, those skilled in the art will appreciate that the implementation of the systems and methods described herein are not limited to the World Wide Web. For example, the systems and methods described herein may also be used to generate search results. FIG. 7 is a pictorial diagram depicting sample search results observed from a dedicated database of source content. As noted with respect to FIG. 6, a search Web page or other software application interface 702, such as a library book search interface, may be used to enter search queries in a text box 704 and receive search results 706. In one embodiment, the search result 706 may comprise a source title 710 and a relevant image 708 from the source. In another embodiment, the search results 706 may include exploration control interface buttons for further search and/or exploration inside of a selected search result 706.

Figure 8:
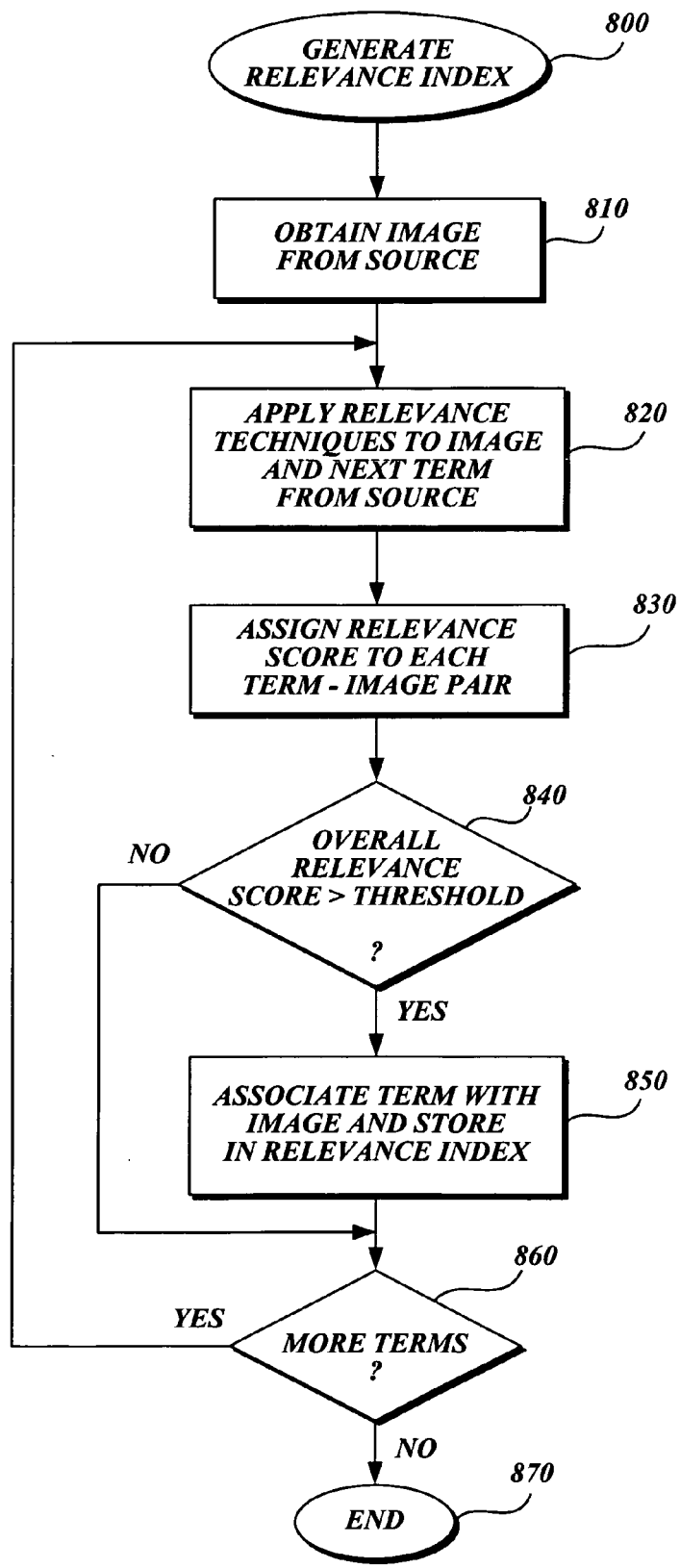
FIG. 8 is a flow diagram showing a sample method for application of relevance techniques to images and terms obtained from a source page.

As noted above with respect to FIGS. 6 and 7, search results may include images from inside sources such as books, magazines, etc. The images returned in response to a search query are obtained using the relevance index 114, as discussed with respect to FIGS. 1 and 2. The relevance index is generally pre-compiled by systematically processing terms and images obtained from source. Those skilled in the art will appreciate that generating the relevance index 114 may be done in many different ways without departing from the spirit of the present disclosures. In one embodiment, the type of source may be determined prior to other elements, such as application of relevance techniques. For example, if the source is a book, determining the type of book allows selective application of relevance techniques most suitable for the type of book identified. Furthermore, some relevance techniques may have settable parameters, e.g., a threshold distance between terms and images usable to determine association of the terms and images, which may have different values depending on the type of source being processed. In another embodiment, the type of source determined may indicate the most suitable relevance technique to use next so as to maximize the efficiency of the relevance index generation process. For example, if the type of source was determined to be "technical," the navigational metadata identifying list of illustrations may be the next relevance technique employed since it is likely that a technical source will include a list of illustrations and that such a list will likely provide a good source of keywords. Similarly, other sequences of techniques may be used to generate the relevance index 114. FIG. 8 is a flow diagram showing a sample method for generating a relevance index 114. The routine 800 proceeds to block 810 where an image is obtained from the source. In one embodiment, the image is obtained from the image and metadata data store 108 shown in FIG. 1. In block 820, relevance techniques are applied to the image and terms selected from the source according to the requirements of the particular relevance technique being applied. In one embodiment, the terms are obtained from the text and metadata data store 106 as shown in FIG. 1. In one embodiment, each relevance technique, including but not limited to techniques discussed with respect to FIG. 2, is in turn applied to the image and selected term in order to produce a relevance score. A weighted combination of scores obtained from the application of each relevance technique may then be used to obtain an overall relevance score. The overall relevance score may then be compared with a relevance threshold in decision block 840 to determine whether the selected term is considered relevant to the image.

In one embodiment, different scores are produced by a particular relevance technique based on certain conditions defined by the relevance technique. For example, the image reference keyword relevance technique may produce a numerical score, such as 50, if the phrase "FIG. 1" is encountered on a page, while a different numerical score, such as 75, may be produced if in addition to the phrase "FIG. 1" the image being processed is located on the same page. In yet another embodiment, the weights assigned to the scores may be different for the type of source being analyzed. For example, the weights assigned to the scores produced when processing a children's book may be different from the weights assigned to the same scores when processing a technical or historical book.

If the overall relevance score is greater than the relevance threshold in decision block 840, the routine 800 proceeds to block 850 where the selected term is stored in the relevance index 114 as a keyword associated with the image. Otherwise, the routine 800 proceeds to block 860. At block 860, the routine 800 determines whether more terms exist that may be relevant to the image. If more terms exist, the routine 800 proceeds back to block 820 where the next term is selected and analyzed. Otherwise, the routine 800 terminates at block 870. Those skilled in the art will appreciate that "stop words" such as "a," "the," "at," etc., may be filtered out from the analysis prior to or during the routine 800, so that such terms are not analyzed. Once all images from data store 108 and all potentially relevant terms from data store 106 have been processed, the relevance index 114 may be used as described above to identify and display images corresponding search queries as described above. In one embodiment, the relevance index 114 is generated before being used by the search server 406. In another embodiment, the relevance index 114 is dynamically updated while being used by search server 406.

While sample embodiments have been illustrated and described, it will be appreciated that various changes can be made therein without departing from the spirit and scope of this disclosure.

What is claimed is:

1. A computer system for associating keywords with images included in a source, the source comprising one or more sections, the system comprising:
   an extraction component configured to extract text and related text metadata, and images and related image metadata, from the one or more sections of the source;
   a first data store configured to store at least the text and related text metadata extracted from the one or more sections of the source;
   a second data store configured to store at least the images and related image metadata extracted from the one or more sections of the source; and
   a relevance engine configured to:
      identify a type of the source;
      determine at least one keyword from the text and related text metadata stored in the first data store, wherein at least part of the related text metadata describes the text from which the at least one keyword is determined;
      select at least one relevance technique, out of a plurality of relevance techniques, based on the identified type of the source; and
      generate an association of the determined at least one keyword with at least one image and related image metadata stored in the second data store using the at least one relevance technique selected based on the identified type of the source, wherein each of the selected at least one relevance technique utilizes at least in part the related text metadata and the related image metadata to calculate a relevance score for determining whether to generate the association, and wherein the relevance score is weighted based at least in part on a suitability of the at least one relevance technique for the identified type of the source,
   wherein the generated association is recorded in a relevance index, and wherein the association is used to access the at least one image associated with the keyword in response to a search query including the keyword.

2. The computer system of claim 1, wherein the first data store and second data store are combined.

3. The computer system of claim 1, wherein the relevance engine generates the association using the at least one relevance technique based at least in part on a physical arrangement of the one or more sections of the source.

4. The computer system of claim 1, wherein the relevance engine generates the association using the at least one relevance technique based at least in part on typography of the text in the one or more sections of the source.

5. The computer system of claim 1, wherein the relevance engine generates the association using the at least one relevance technique based at least in part on semantic analysis of the one or more sections of the source.

6. The computer system of claim 1, wherein the relevance engine generates the association using the at least one relevance technique based at least in part on navigational elements of the one or more sections of the source.

7. The computer system of claim 1, wherein the relevance engine generates the association using the at least one relevance technique based at least in part on statistical analysis of the one or more sections of the source.

8. The computer system of claim 1, wherein the relevance engine generates the association using the at least one relevance technique based at least in part on manual assessment of the one or more sections of the source.

9. The computer system of claim 1, wherein the association between the keyword and the image is recorded in the relevance index as a pointer to the image stored in the image data store.

10. The computer system of claim 1, wherein the type of the source includes at least one of a cookbook and a technical treatise.

11. A computer-implemented method for associating keywords with images within a source, the computer-implemented method comprising:
under the control of one or more computer systems configured with executable instructions,
obtaining data from one or more sections of the source, wherein the data includes text data, image data and related metadata comprising text metadata related to the text data;
identifying a type of the source;
selecting at least one relevance technique, out of a plurality of relevance techniques, based at least in part on the identified type of the source;
for a given term in the text data, determining if the term is associated with an image in the one or more sections based at least in part on the obtained data by applying the at least one relevance technique selected based at least in part on the identified type of the source, wherein each of the selected at least one relevance technique utilizes at least in part the related metadata to calculate a relevance score to determine if the term is associated with the image, wherein the relevance score is weighted based at least in part on a suitability of the at least one relevance technique for the identified type of the source, and wherein at least part of the related metadata describes the text data the given term is from; and
if the term is associated with an image from the one or more sections, storing the term as a keyword associated with the image, wherein the association is used to access the image associated with the keyword in response to a search query including the keyword.

12. The computer-implemented method of claim 11, wherein determining if the term is associated with an image comprises determining if the term falls within a predetermined distance of the image.

13. The computer-implemented method of claim 12, wherein the predetermined distance is a physical distance between the term and the image.

14. The computer-implemented method of claim 12, wherein the predetermined distance is a predetermined number of terms between the term and the image.

15. The computer-implemented method of claim 11, wherein determining if the term is associated with an image comprises:
determining if the image is glossy; and
identifying the term from caption text for the image.

16. The computer-implemented method of claim 11, wherein determining if the term is associated with an image comprises determining if the term is found within the image.

17. The computer-implemented method of claim 11, wherein determining if the term is associated with an image comprises:
determining if the term is an image reference term; and
determining if the image is in a vicinity of the term.

18. The computer-implemented method of claim 11, wherein determining if the term is associated with an image comprises:
identifying a term appearing in a different font; and
determining if the image is in a vicinity of the term.

19. The computer-implemented method of claim 11, wherein determining if the term is associated with an image comprises:
identifying a term appearing in parenthesis; and
determining if the image is in a vicinity of the term.

20. The computer-implemented method of claim 11 further comprising:
determining the type of source from which the data is obtained; and
determining if the term is associated with an image in the one or more sections based at least in part on the obtained data and the type of source.

21. The computer-implemented method of claim 11, wherein determining if the term is associated with an image comprises:
determining a ratio of a number of terms to a number of images in the source; and
determining if the ratio is below a threshold.

22. The computer-implemented method of claim 11, wherein determining if the term is associated with an image comprises:
determining if the term appears in navigational metadata; and
determining if the image is referenced in the navigational metadata.

23. The computer-implemented method of claim 11, wherein the at least one relevant technique includes a physical arrangement technique, a typography technique, a semantic analysis technique, statistical analysis technique, a navigational analysis technique and a manual technique.

24. The computer-implemented method of claim 11, wherein the type of the source includes at least one of a cookbook and a technical treatise.

25. A computer system for associating keywords with images found on the sections of a source, the system comprising:
a data store that is configured to store at least text, images and related metadata obtained from the source sections, the metadata comprising text metadata related to the text; and
a relevance engine that is configured to:
identify a type of the source;
select at least one relevance technique, out of a plurality of relevance techniques, based at least in part on the identified type of the source; and generate an association between a keyword from the text and an image from the source by applying the at least one relevance technique selected based at least in part on the identified type of the source, wherein each of the selected at least one relevance technique utilizes at least in part the related metadata to calculate a relevance score for determining whether to generate the association, wherein the relevance score is weighted based at least in part on a suitability of the at least one relevance technique for the identified type of the source, wherein at least part of the related metadata describes the text the keyword is from, and wherein the generated association is recorded in a relevance index and wherein the association is used to access the image associated with the keyword in response to a search query including the keyword.

26. The computer system of claim 25, wherein the data store comprises a first data store that is configured to store at least text and text related metadata and a second data store that is configured to store at least images and image related metadata.

27. The computer system of claim 25, wherein the at least one relevance technique includes one or more of a physical arrangement technique, a typography technique, a semantic analysis technique, statistical analysis technique, a navigational analysis technique and a manual technique.

28. The computer system of claim 25, wherein the at least one relevance technique associates the keyword from the text and the image of the source by:
determining if a term from the text falls within a predetermined distance of the image; and
recording the term as the keyword associated with the image in the relevance index.

29. The computer system of claim 28, wherein the predetermined distance is a physical distance between the term and the image.

30. The computer system of claim 28, wherein the predetermined distance is a predetermined number of terms between the term and the image.

31. The computer system of claim 25, wherein the at least one relevance technique associates the keyword from the text and the image of the source by:
determining if the image is glossy;
identifying a term from caption text for the image; and
recording the term as the keyword associated with the image in the relevance index.

32. The computer system of claim 25, wherein the at least one relevance technique associates the keyword from the text and the image of the source by:
determining if a term is found within the image; and
recording the term as the keyword associated with the image in the relevance index.

33. The computer system of claim 25, wherein the at least one relevance technique associates the keyword from the text and the image of the source by:
determining if a term is an image reference term;
determining if the image is in a vicinity of the term; and
recording the term as the keyword associated with the image in the relevance index.

34. The computer system of claim 25, wherein the at least one relevance technique associates the keyword from the text and the image of the source by:
identifying a term appearing in a different font;
determining if the image is in a vicinity of the term; and
recording the term as the keyword associated with the image in the relevance index.

35. The computer system of claim 25, wherein the at least one relevance technique associates the keyword from the text and the image of the source by:
identifying a term appearing in parenthesis;
determining if the image is in a vicinity of the term; and
recording the term as the keyword associated with the image in the relevance index.

36. The computer system of claim 25, wherein at least one relevance technique associates the keyword from the text and the image of the source by:
identifying a term appearing in a navigational element of the source;
identifying the image found at a section number corresponding to the term; and
recording the term as the keyword associated with the image in the relevance index.

37. The computer system of claim 25, wherein the at least one relevance technique associates the keyword from the text and the image of the source by:
manually identifying a term relevant to the image; and
recording the keyword associated with the image in the relevance index.

38. The computer system of claim 25, wherein the association between the keyword and the image is recorded in the relevance index as a pointer to the image stored in the image data store.

39. The computer system of claim 25, wherein the metadata comprises distances from keywords of the text to at least some of the images.

40. The computer system of claim 25, wherein a distance between each keyword and image associated in the relevance index is less than a threshold value.

41. The computer system of claim 25, wherein the type of the source includes at least one of a cookbook and a technical treatise.

42. A computer-readable storage medium having instructions encoded thereon that, when executed by a computing device, cause the computing device to, at least:
identify a type of a source;
select at least one relevance technique, out of a plurality of relevance techniques, based at least in part on the identified type of the source;
obtain data from one or more sections of the source, wherein the data includes text data, image data and related metadata comprising text metadata related to the text data;
for a given term in the text data, determine if the term is associated with an image in the one or more sections based at least in part on the obtained data using the at least one relevance technique selected based at least in part on the identified type of the source, wherein each or the at least one relevance technique utilizes at least in part the related metadata to calculate a relevance score to determine if the term is associated with the image, wherein the relevance score is weighted based at least in part on a suitability of the at least one relevance technique for the identified type of the source, and wherein at least part of the related metadata describes the text data the given term is from; and
if the term is associated with an image from the one or more sections, store the term as a keyword associated with the image, wherein the association may be used to access the image associated with the keyword in response to a search query including the keyword.

43. The computer-readable storage medium of claim 42, wherein determining if the term is associated with an image comprises determining if the term falls within a predetermined distance of the image.

44. The computer-readable storage medium of claim 43, wherein the predetermined distance is a physical distance between the term and the image.

45. The computer-readable storage medium of claim 43, wherein the predetermined distance is a predetermined number of terms between the term and the image.

46. The computer-readable storage medium of claim 42, wherein determining if the term is associated with an image comprises:
    determining if the image is glossy; and
    identifying the term from caption text for the image.

47. The computer-readable storage medium of claim 42, wherein determining if the term is associated with an image comprises determining if the term is found within the image.

48. The computer-readable storage medium of claim 42, wherein determining if the term is associated with the images comprises:
    determining a ratio of a number of terms to a number of images in the source; and
    determining if the ratio is below a threshold.

49. The computer-readable storage medium of claim 42, wherein determining if the term is associated with the image comprises:
    manually identifying a term relevant to the image; and
    recording the term as the keyword associated with the image in the relevance index.

50. The computer-readable storage medium of claim 42, wherein determining if the term is associated with the image comprises:
    determining if the term appears in navigational metadata; and
    determining if the image is referenced in the navigational metadata.

51. The computer-readable storage medium of claim 42, wherein the instructions encoded thereon, when executed by the computing device, further cause the computing device to, at least:
    determine the type of source from with the data is obtained; and
    determine if the term is associated with an image in the one or more sections based at least in part on the obtained data and the type of source.

52. The computer-readable storage medium of claim 42, wherein the instructions encoded thereon, when executed by the computing device, further cause the computing device to apply at least one of the following to the text data, image date and related metadata: a physical arrangement technique, a typography technique, a semantic analysis technique, statistical analysis technique, a navigational analysis technique and a manual technique.

53. The computer-readable storage medium of claim 42, wherein the metadata comprises locations of keywords of the text data within ones of the sections.

54. The computer-readable storage medium of claim 42, wherein the type of the source includes at least one of a cookbook and a technical treatise.

* * * * *